United States Patent
Suh et al.

(10) Patent No.: US 10,026,934 B2
(45) Date of Patent: Jul. 17, 2018

(54) FLEXIBLE RECHARGEABLE BATTERY

(71) Applicant: SAMSUNG SDI CO., LTD., Yongin-si, Gyeonggi-do (KR)

(72) Inventors: Jun-Won Suh, Yongin-si (KR); Jeong-Doo Yi, Yongin-si (KR); Ju-Hyeong Han, Yongin-si (KR); Ju-Hee Sohn, Yongin-si (KR); Hyun-Hwa Song, Yongin-si (KR); Seok-Hun Hong, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 78 days.

(21) Appl. No.: 14/799,542

(22) Filed: Jul. 14, 2015

(65) Prior Publication Data
US 2016/0149171 A1 May 26, 2016

(30) Foreign Application Priority Data
Nov. 21, 2014 (KR) .................. 10-2014-0163371

(51) Int. Cl.
*H01M 2/02* (2006.01)
*H01M 2/18* (2006.01)
(Continued)

(52) U.S. Cl.
CPC ......... *H01M 2/0275* (2013.01); *H01M 2/021* (2013.01); *H01M 2/0212* (2013.01);
(Continued)

(58) Field of Classification Search
CPC combination set(s) only.
See application file for complete search history.

(56) References Cited

U.S. PATENT DOCUMENTS 5,601,946 A * 2/1997 Hattori .................. H01M 2/18
429/206
6,599,659 B1 7/2003 Endo et al.
(Continued)

FOREIGN PATENT DOCUMENTS

CN 103943885 A 7/2014
JP 2003-123706 4/2003
(Continued)

OTHER PUBLICATIONS

EPO Search Report dated Mar. 3, 2016, for corresponding European Patent application 15187622.4, (8 pages).
(Continued)

*Primary Examiner* — Imran Akram
(74) *Attorney, Agent, or Firm* — Lewis Roca Rothgerber Christie LLP

(57) ABSTRACT

A rechargeable battery is provided which includes a stacked electrode assembly in a pouch where the electrode assembly changes in length due to an applied bending stress. According to an exemplary embodiment, a rechargeable battery includes: an electrode assembly including a first electrode, a separator, and a second electrode stacked together and the first electrode, the separator, and the second electrode being fixed with respect to each other by a fixed part at one side of the electrode assembly; and a flexible case accommodating the electrode assembly therein, wherein a gap between a free end of the electrode assembly and an inner surface of the case to accommodate a change in length of the electrode assembly at the free end when the electrode assembly is bent.

9 Claims, 5 Drawing Sheets

(51) Int. Cl.
*H01M 4/70* (2006.01)
*H01M 10/04* (2006.01)
*H01M 2/16* (2006.01)
*H01M 10/0585* (2010.01)

(52) U.S. Cl.
CPC ......... *H01M 2/0287* (2013.01); *H01M 2/168* (2013.01); *H01M 2/18* (2013.01); *H01M 4/70* (2013.01); *H01M 10/0436* (2013.01); *H01M 2/0217* (2013.01); *H01M 10/0585* (2013.01)

(56) References Cited

U.S. PATENT DOCUMENTS

| | | | | |
|---|---|---|---|---|
| 6,632,538 | B1* | 10/2003 | Yamazaki | H01M 2/021 428/213 |
| 8,753,763 | B2 | 6/2014 | Kwon et al. | |
| 2012/0040235 | A1 | 2/2012 | Cho et al. | |
| 2012/0202101 | A1* | 8/2012 | Ueda | H01M 2/021 429/127 |
| 2012/0244421 | A1* | 9/2012 | Yamazaki | H01M 2/021 429/176 |
| 2013/0101884 | A1* | 4/2013 | Ueda | H01M 10/052 429/127 |
| 2013/0323567 | A1* | 12/2013 | Saki | H01M 2/0217 429/127 |
| 2014/0079979 | A1 | 3/2014 | Kwon et al. | |
| 2015/0171382 | A1* | 6/2015 | Suh | H01M 2/08 429/127 |
| 2015/0207167 | A1* | 7/2015 | Ueda | H01M 10/02 429/127 |

FOREIGN PATENT DOCUMENTS

| | | | | |
|---|---|---|---|---|
| JP | 2003-187759 | | 7/2003 | |
| KR | 2002-0017973 | A | 3/2002 | |
| KR | 10-2012-0013883 | A | 2/2012 | |
| KR | 10-2012-0024108 | | 3/2012 | |
| KR | 10-2012-0052644 | A | 5/2012 | |
| KR | 1020150069918 | * | 6/2015 | ......... H01M 2/0275 |

OTHER PUBLICATIONS

English machine translation of Chinese Publication 103943885 dated Jul. 23, 2014, (15 pages).
English machine translation of Japanese Publication 2003-12706 dated Apr. 25, 2003, (16 pages).
English machine translation of Japanese Publication 2003-187759 dated Jul. 4, 2003, (13 pages).

* cited by examiner

200

FLEXIBLE RECHARGEABLE BATTERY

CROSS-REFERENCE TO RELATED APPLICATION

This application claims priority to and the benefit of Korean Patent Application No. 10-2014-0163371 filed in the Korean Intellectual Property Office on Nov. 21, 2014, the entire content of which is incorporated herein by reference.

BACKGROUND

1. Field

Aspects of embodiments of the present invention relate to a rechargeable battery having flexibility.

2. Description of the Related Art

With the technological development of mobile devices, a demand for rechargeable batteries as an energy source has increased. A rechargeable battery is a battery which is designed to repeatedly perform charging and discharging operations, unlike a primary battery.

Small-capacity rechargeable batteries may be used in small portable electronic devices such as mobile phones, laptop computers, and camcorders.

Large-capacity rechargeable batteries may be used as power supplies for driving motors for hybrid vehicles and electric vehicles.

For example, a rechargeable battery may include an electrode assembly which performs charging and discharging operations, a pouch which accommodates the electrode assembly, and an electrode tab which extends from the electrode assembly outside the pouch. This pouch-type rechargeable battery may be configured to have a stacked electrode assembly and an electrolyte solution embedded in the pouch.

A stacked electrode assembly is arranged by repeatedly stacking an anode, a separator, a cathode, and a separator and has electrode tabs that extend to the outside of the pouch. The electrode tabs are welded to uncoated regions of the cathode and the anode.

When a bending stress is applied to the stacked electrode assembly, a curvature radius of an inner surface of the bent electrode assembly is reduced by ½ of a thickness and thus a length thereof is reduced in a ½ inner region of the thickness, such that the inner surface of the bent electrode assembly is contracted.

To the contrary, a curvature radius of an outer surface of the electrode assembly is increased by ½ of a thickness and thus a length thereof is increased in a ½ outer region of the thickness, such that the outer surface of the electrode assembly is expanded.

Accordingly, the rechargeable battery is deformed.

Even though the bending stress is applied to the pouch type rechargeable battery, the rechargeable battery is not bent by the desired curvature, and therefore, for the rechargeable battery to be bent at the desired curvature, a very large bending stress needs to be applied to the rechargeable battery.

In this case, when the bending stress beyond a threshold stress is applied to the pouch type rechargeable battery, the rechargeable battery may be fractured and a short-circuit may occur in the rechargeable battery.

The above information disclosed in this Background section is only for enhancement of understanding of the background of the invention and therefore it may contain information that does not form prior art.

SUMMARY

Aspects of one or more embodiments of the present invention are directed toward a rechargeable battery including a stacked electrode assembly in a pouch where the electrode assembly changes in length due to an applied bending stress.

An exemplary embodiment of the present invention provides a rechargeable battery including: an electrode assembly including a first electrode, a separator, and a second electrode stacked together and the first electrode, the separator, and the second electrode being fixed with respect to each other by a fixed part at one side of the electrode assembly; and a flexible case accommodating the electrode assembly therein, wherein a gap is between a free end of the electrode assembly and an inner surface of the case to accommodate a change in length of the electrode assembly at the free end when the electrode assembly is bent.

The rechargeable battery may further include a first electrode tab and a second electrode tab connected to the first electrode and the second electrode, respectively, wherein the first and second electrode tabs extend from one end of the case to an outside thereof, and wherein the gap may beat an opposite side of the electrode assembly from the first electrode tab and the second electrode tab.

The first electrode and the second electrode may have uncoated regions corresponding to sides of the first electrode tab and the second electrode tab, respectively.

The fixed part may be bonded to the uncoated region of the first electrode, the separator, and the uncoated region of the second electrode by an adhesive.

The separator may include a first bonded part bonded to the uncoated region of the first electrode, a second bonded part bonded to the uncoated region of the second electrode, and a cut groove partitioning the first bonded part and the second bonded part from each other at the fixed part.

The gap may be at an opposite side of the electrode assembly from the fixed part.

When a characteristic length of the electrode assembly is L, a thickness of the electrode assembly is t, and allowable curvature radius of the electrode assembly is R, a length ML of the gap may be $ML = 0.5 * t * L/R$.

The characteristic length L may be a length of the electrode assembly along which the first electrode, the separator, and the second electrode in the electrode assembly are slidable relative to each other.

When the characteristic length L is 110 mm and a thickness t is 1.3 mm, the allowable curvature radius R may be 20 to 50 mm.

When the characteristic length L is 110 mm and a thickness t is 1.3 mm, the allowable curvature radius R may be 25 to 40 mm.

As described above, according to an exemplary embodiment of the present invention, the first electrode, the separator, and the second electrode are stacked and fixed by the fixed part formed at one side of the electrode assembly and the gap is provided between the electrode assembly and the case, thereby allowing the gap to accommodate a change in length of the electrode assembly due to a bending of the stacked electrode assembly.

That is, when a bending stress is applied to the rechargeable battery, the first electrode, the separator, and the second electrode are slidable or slippable relative to each another. Thus, the rechargeable battery may be bent bringing about the change in length of the electrode assembly at a free end of the electrode assembly, thereby making the gap accommodate the increased length of the electrode assembly at its free end.

Therefore, it is possible to prevent or substantially prevent the rechargeable battery from being fractured and prevent or substantially prevent an internal short-circuit of the rechargeable battery when the rechargeable battery is bent by a bending stress.

DETAILED DESCRIPTION

Figure 1:
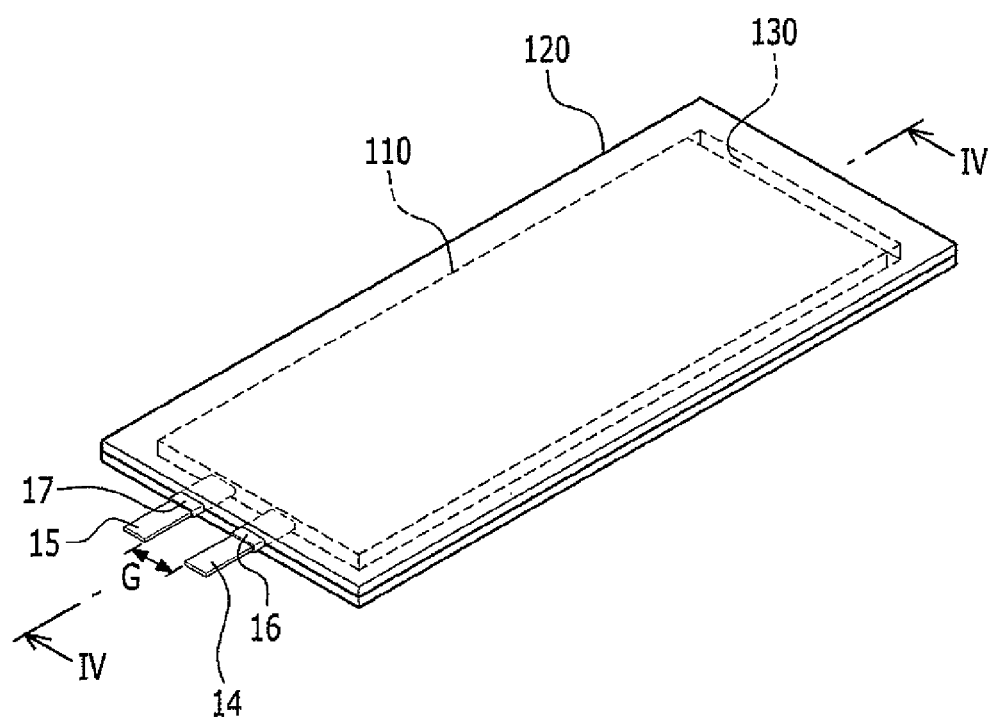
FIG. 1 is a perspective view of a rechargeable battery according to an exemplary embodiment of the present invention.

Hereinafter, the present invention will be described more fully with reference to the accompanying drawings, in which embodiments of the invention are shown. As those skilled in the art would realize, the described embodiments may be modified in various different ways, all without departing from the spirit or scope of the present invention. The drawings and description are to be regarded as illustrative in nature and not restrictive. Like reference numerals designate like elements throughout the specification.

Expressions such as "at least one of," when preceding a list of elements, modify the entire list of elements and do not modify the individual elements of the list. Further, the use of "may" when describing embodiments of the present invention refers to "one or more embodiments of the present invention."

When a first element is described as being "coupled" or "connected" to a second element, the first element may be directly "coupled" or "connected" to the second element, or one or more other intervening elements may be located between the first element and the second element. Spatially relative terms, such as "beneath", "below", "lower", "downward", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section, without departing from the spirit and scope of the inventive concept.

The terminology used herein is for the purpose of describing particular embodiments only and is not intended to be limiting of the inventive concept. As used herein, the singular forms "a" and "an" are intended to include the plural forms as well, unless the context clearly indicates otherwise. Also, the term "exemplary" is intended to refer to an example or illustration.

Figure 2:
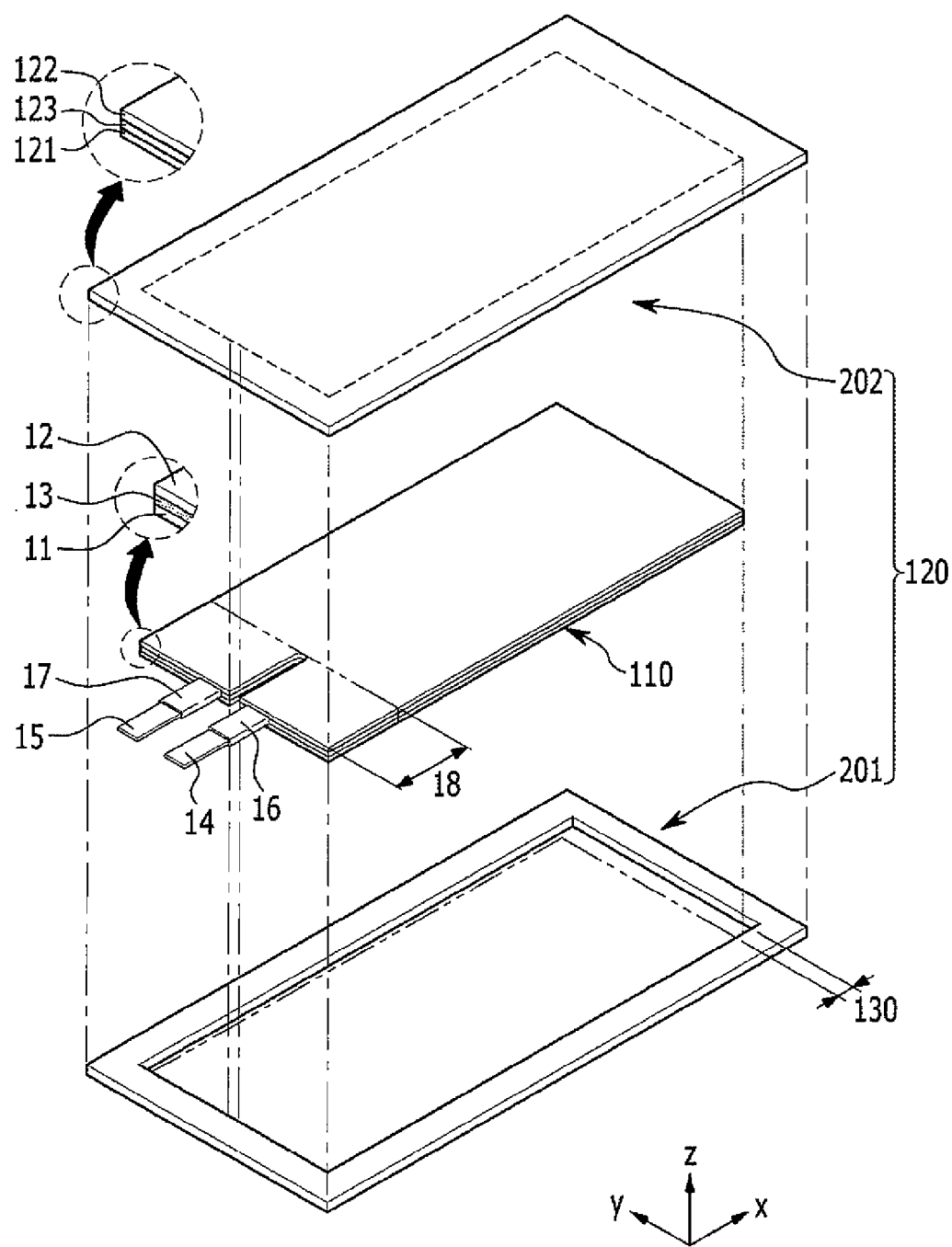
FIG. 2 is an exploded perspective view of the rechargeable battery of FIG. 1.

FIG. 1 is a perspective view of a rechargeable battery according to an exemplary embodiment of the present invention and FIG. 2 is an exploded perspective view of the rechargeable battery of FIG. 1. Referring to FIGS. 1 and 2, a rechargeable battery according to an exemplary embodiment of the present invention includes an electrode assembly 110, a case (hereinafter, referred to as, for example, "pouch 120") in which the electrode assembly 110 is enclosed, and a margin 130 (or margin part) which is established between the electrode assembly 110 and an inner surface of the pouch 120 to accommodate a change in length of the electrode assembly 110. In other words, a margin 130 is a gap between the electrode assembly 110 and the inner surface of the pouch 120.

Figure 3:
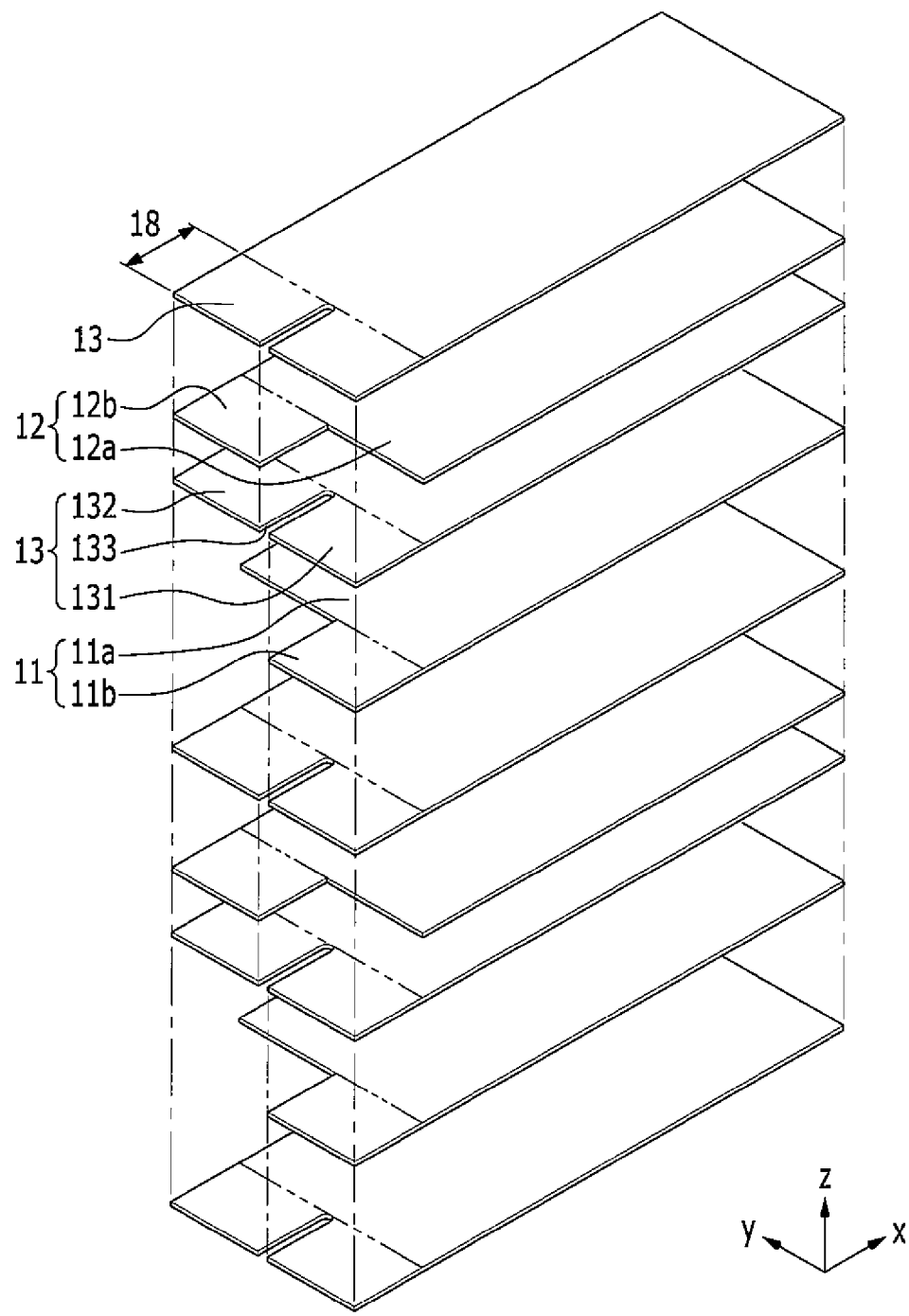
FIG. 3 is an exploded perspective view of the electrode assembly of FIG. 2.

FIG. 3 is an exploded perspective view of the electrode assembly of FIG. 2. Referring to FIGS. 2 and 3, the electrode assembly 110 is formed as a stacked electrode assembly in which a first electrode 11 and a second electrode 12 are stacked with a separator 13 positioned therebetween. The separator 13 may be formed of a polymer film through which lithium ion passes.

The electrode assembly 110 further includes a first electrode tab 14 and a second electrode tab 15 which are connected to the first and second electrodes 11 and 12, respectively. The first and second electrode tabs 14 and 15 are drawn out from one end of the pouch 120 to the outside to form a tab gap (G) therebetween.

The first and second electrodes 11 and 12 and the separator 13 are fixed by a fixed part 18 which is formed at one side of the electrode assembly 110 and they are not fixed with respect to each other at an opposite side of the electrode assembly 110, which is thus formed as a free end. That is, the first and second electrodes 11 and 12 and the separator 13 are stacked, for example as layers, and these layers may slide or slip past one another along the length of the electrode assembly 110, except at the fixed part 18.

The fixed part 18 is formed by bonding an uncoated region 11b of the first electrode 11, the separator 13, and an uncoated region 12b of the second electrode 12 by an adhesive. For example, the fixed part 18 may be formed by repeating a process of applying the adhesive on the separator 13 corresponding to the uncoated region 11b, attaching the uncoated region 11b of the first electrode 11 thereon, and then applying the adhesive on the uncoated region 11b and attaching the separator 13 thereon and applying the adhesive on the separator 13 corresponding to the uncoated region 12b, attaching the uncoated region 12b of the second electrode 12 thereon, and then applying the adhesive on the uncoated region 12b and attaching the separator 13 thereon.

For this purpose, the separator 13 includes a first bonded part 131 corresponding to the uncoated region 11b of the first electrode 11 at the fixed part 18 and a second bonded part 132 corresponding to the uncoated region 12b of the second electrode 12. The first and second bonded parts 131 and 132 may be partitioned by a cut groove 133 at the fixed part 18.

Therefore, the adhesive is bonded to the uncoated region 11b of the first electrode 11 at the first bonded part 131 and is bonded to the uncoated region 12b of the second electrode 12 at the second bonded part 132. The uncoated regions 11b and 12b of the first and second electrodes 11 and 12 are separated from each other by the cut groove 133, and therefore an electrically strong insulating structure may be formed.

The margin 130 is established at an opposite side of the electrode assembly 110 from the fixed part 18. The margin 130 accommodates a change in length of the electrode assembly 110 which is provided at the opposite side of the fixed part 18 in a length direction (x-axis direction) of the rechargeable battery and the electrode assembly 110 when the electrode assembly 110 is bent. In other words, the margin 130 is a gap that accommodates the change in length of the electrode assembly 110 at the free end.

According to the exemplary embodiment of the present invention, the fixed part 18 is provided in the uncoated regions 11b and 12b, and therefore is formed at the opposite side of the electrode assembly 110 from the margin 130. In some embodiments, the fixed part may also be formed at a middle portion in the length direction (x-axis direction) of the electrode assembly 110. In this case, as the fixed part is provided at a side adjacent to the uncoated region, the electrode assembly may be effectively bent by the bending stress.

As a distance between the fixed part 18 and the margin 130 in the electrode assembly 110 is shortened, the portion along the length of the electrode assembly 110 that is capable of changing in length when bent may be reduced. However, having the fixed part adjacent to the uncoated region may reduce or minimize the reduction in the length of the portion of the electrode assembly 110 capable of changing in length when bent.

When the bending stress is applied to the rechargeable battery, the electrode assembly 110 is bent. In this case, the first and second electrodes 11 and 12 and the separator 13 slide in the pouch 120 while remaining fixed at the fixed part 18 and the length of the electrode assembly 110 when bent may be increased or decreased at the free end. Therefore, the electrode assembly 110 and the rechargeable battery may be smoothly bent.

The first electrode 11 includes a coating part 11a in which an active material is applied on a current collector of a metal thin plate of the first electrode 11 and the uncoated region 11b which does not include the active material on the current collector. In some embodiments, the current collector of the first electrode 11 and the first electrode tab 14 may be made of aluminum (Al).

The second electrode 12 includes a coating part 12a in which an active material different from the active material of the first electrode 11 is applied on a current collector of a metal thin plate of the second electrode 12 and the uncoated region 12b which does not include the active material on the current collector. In some embodiments, the current collector of the second electrode 12 and the second electrode tab 15 may be made of copper (Cu).

In the stacked state of the electrode assembly 110, the first and second electrodes 11 and 12 have the uncoated regions 11b and 12b alternately disposed at opposite sides in a width direction (y-axis direction). That is, in FIG. 3, the uncoated region 11b of the first electrode 11 is disposed on the right and the uncoated region 12b of the second electrode 12 is disposed on the left.

Referring again to FIGS. 1 and 2, the first electrode tab 14 is connected to the uncoated region 11b of the first electrode 11 and the second electrode tab 15 is connected to the uncoated region 12b of the second electrode 12. Therefore, the first and second electrode tabs 14 and 15 form a tab gap G at an outside of one side of the pouch 120. The first and second electrode tabs 14 and 15 may be connected to the uncoated regions 11b and 12b by welding.

The pouch 120 has flexibility to accommodate the electrode assembly 110 and an outside thereof is heat-fused, thereby forming the rechargeable battery. In this case, the first and second electrode tabs 14 and 15 are coated with insulating members 16 and 17 and are drawn out to the outside of the pouch 120 through the fused portion. The insulating members 16 and 17 electrically insulate the first and second electrode tabs 14 and 15 and electrically insulate the first and second electrode tabs 14 and 15 from the pouch 120.

The pouch 120 may have a multi-layered sheet structure and the pouch 120 encloses the electrode assembly 110, wherein a margin 130 (or gap) is between the inner surface of the pouch 120 and the free end of the electrode assembly 110. For example, as shown in FIG. 2, the pouch 120 includes a polymer sheet 121 which forms an inner surface and performs an insulating and heat-fusing operation, a polyethyleneterephthalate (PET) sheet, nylon sheet or a PET-nylon composite sheet 122 (hereinafter, for convenience, referred to as a "nylon sheet" as an example) which forms an outer surface and performs a protective operation, and a metal sheet 123 which provides mechanical strength. The metal sheet 123 is interposed between the polymer sheet 121 and the nylon sheet 122 and may be formed as, for example, an aluminum sheet.

The pouch 120 includes a first exterior material 201 which accommodates the electrode assembly 110 and a second exterior material 202 which covers the electrode assembly 110 and is heat-fused to the first exterior material 201 at the outside of the electrode assembly 110.

The first and second exterior materials 201 and 202 may be configured to include the polymer sheet 121, the nylon sheet 122, and the metal sheet 123 which have the same or substantially the same layer structure. Although not illustrated, the first and second exterior materials may be sealed, having a gasket interposed therebetween.

For example, the first exterior material 201 is formed to have a concave structure so as to accommodate the electrode assembly 110 and the second exterior material 202 is flatly formed to cover the electrode assembly 110 which is accommodated in the first exterior material 201. Although not illustrated, the second exterior material may also be connected to the first exterior material.

Figure 4:
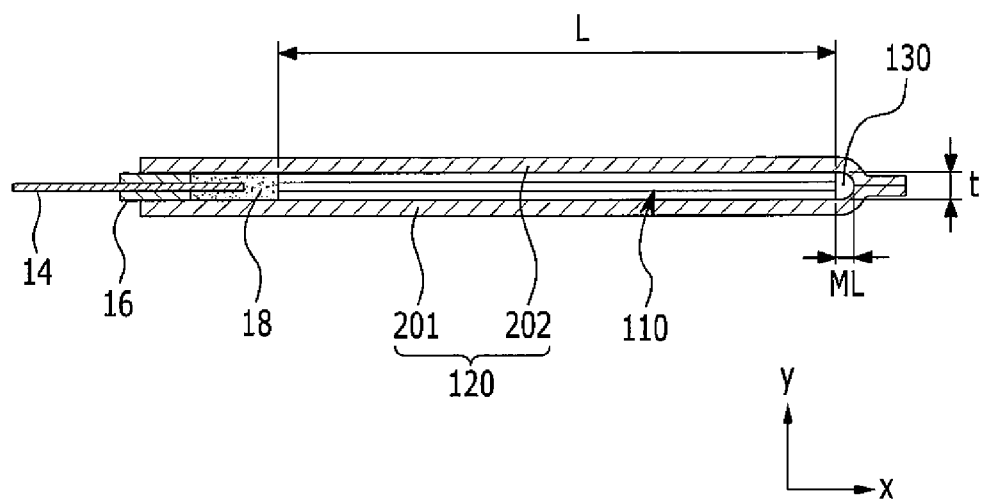
FIG. 4 is a cross-sectional view taken along the line IV-IV of FIG. 1.

FIG. 4 is a cross-sectional view taken along the line IV-IV of FIG. 1. Referring to FIG. 4, in the rechargeable battery according to an exemplary embodiment of the present invention, the margin 130 is provided at an opposite side of the first and second electrode tabs 14 and 15 to accommodate the change in length of the bent electrode assembly 110.

For example, the electrode assembly 110 has a characteristic length L, a thickness t, and an allowable curvature radius R. The characteristic length L refers to the rest length of the electrode assembly 110 in which the fixed part 18 is ruled out from a total length in the x-axis direction of the electrode assembly 110. That is, the characteristic length L refers to the portion which may be bent while directly bringing about a sliding or slipping of the electrode assembly 110 when the bending stress is applied to the electrode assembly 110.

The thickness t refers to a thickness of the electrode assembly 110 which is established at a portion of the characteristic length L. That is, the thickness t refers to the thickness of the portion of the electrode assembly 110 which may be bent while directly bringing about the sliding or slipping of the electrode assembly 110 when the bending stress is applied to the rechargeable battery. That is, the thickness t does not include the thickness of the pouch 120 of the rechargeable battery.

Figure 5:
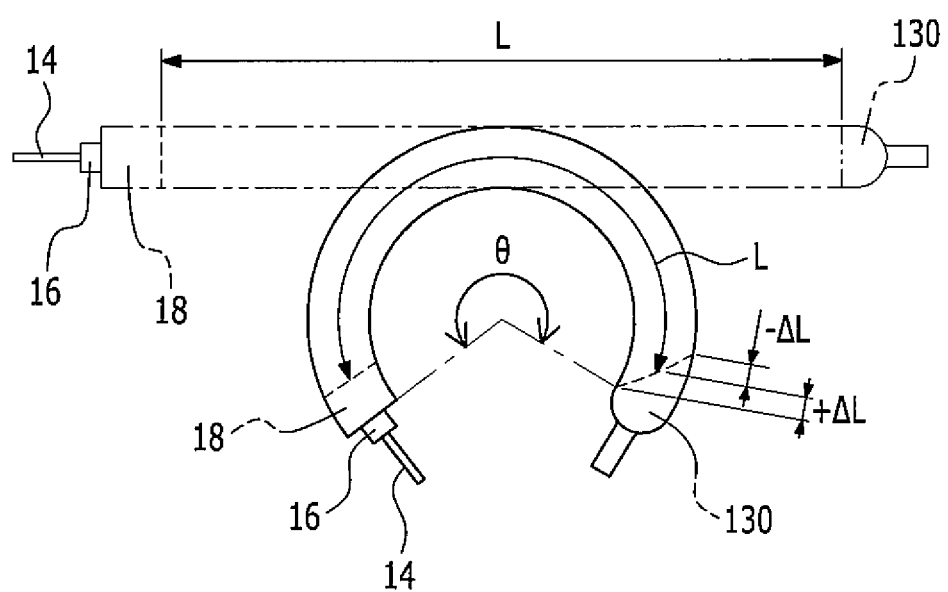
FIG. 5 is a diagram illustrating states of the rechargeable battery of FIG. 1 before and after it is bent.

FIG. 5 is a diagram illustrating states of the rechargeable battery of FIG. 1 before and after it is bent. Referring to FIG. 5, the rechargeable battery is bent at an angle θ (e.g., a predetermined angle θ) due to the bending stress. In this case, the electrode assembly 110 is fixed at the first and second electrode tabs 14 and 15 by the fixed part 18 and forms a free end at the margin 130.

The first and second electrodes 11 and 12 and the separator 13 slide or slip relative to each other while being bent by the bending stress at the portion of the electrode assembly 110 not including the fixed part. In this case, a length is gradually increased (+ ΔL) in an inner region of the thickness t (e.g., an inner half (½) of the thickness t) of the electrode assembly 110 and a length is gradually decreased (−ΔL) in an outer region of the thickness t (e.g., an outer half (½) of the thickness t) of the electrode assembly 110.

A center, which is at a halfway point of the thickness t of the electrode assembly 110, keeps the characteristic length L. A difference between lengths of the inner side and the outer side in the electrode assembly 110 may be represented by a sum of absolute values of the increment (+ΔL) of the inner side and the decrement (−ΔL) of the outer side.

As described above, the increment (+ΔL) of the length of the electrode assembly 110 in the inner region of the thickness t of the electrode assembly 110 is in the direction of to the margin 130. Therefore, the lengths of the first and second electrodes 11 and 12 and the separator 13 are gradually increased in the inner region of the thickness t and thus are gradually accommodated along the length of the margin 130.

A length ML of the margin 130 is represented by the following Equation 1. Equation 1

$$ML=0.5*t*L/R$$

For example, in an embodiment of the rechargeable battery, the characteristic length L is 110 mm, the thickness t is 1.3 mm, and the allowable curvature radius R is 20 to 50 mm. That is, when each number (L=110, t=1.3, and R=20 to 50) is substituted into the above Equation 1, the length ML of the margin 130 is 1.43 to 3.575 mm.

When the allowable curvature radius R is less than 20 mm, the length ML of the margin 130 is excessively increased and therefore a capacity of the rechargeable battery having the above dimensions may deteriorate and when the allowable curvature radius R exceeds 50 mm, the bending degree of the rechargeable battery may be insignificant and a usage of such rechargeable battery may be limited.

In a further embodiment of the rechargeable battery, the characteristic length L is 110 mm, the thickness t is 1.3 mm, and the allowable curvature radius R is 25 to 40 mm. That is, when each number (L=110, t=1.3, and R=25 to 40) is substituted into the above Equation 1, the length ML of the margin 130 is 1.787 to 2.86 mm.

Comparing this further embodiment with the allowable curvature radius R of 20 to 50 mm, when the allowable curvature radius R is equal to or more than 25 mm, it is possible to minimize the deterioration in the capacity of the rechargeable battery while keeping the length ML of the margin 130 and when the allowable curvature radius R is less than 40 mm, the limitation of the usage of the rechargeable battery due to the lack of the bending degree of the rechargeable battery may be overcome.

Meanwhile, the actual margin of the rechargeable battery that is used may be 30 to 70% of the length ML of the calculated margin, as calculated by the above calculation. In this case, the first and second electrodes 11 and 12 and the separator 13 themselves need to be bent. As the actual margin used approaches 70% to 30% of the length ML of the margin (calculated margin), the first and second electrodes 11 and 12 and the separator 13 need to be bent more.

The rechargeable battery may be bent by a degree corresponding to the bending stress and as the length L of the electrode assembly 110 is increased by the action of the bending stress, the increased length is accommodated in the margin 130. Therefore, when the rechargeable battery is bent, the rechargeable battery is not fractured and short-circuits may be prevented or substantially prevented in the rechargeable battery.

When the rechargeable battery according to the exemplary embodiment of the present invention and a pouch-type rechargeable battery (Comparative Example) in which the margin is not included are manufactured and then the bending stress is applied to these rechargeable batteries, performance deterioration was measured by comparing capacity before and after the rechargeable batteries are bent. The curvature radius R was set to be 25 mm and then a bending durability test of the rechargeable battery was performed.

When a bending test of 1,000 cycles was performed on the rechargeable battery of the Comparative Example, a short-circuit occurred in the rechargeable battery. That is, it was very difficult or impossible to measure the performance of the rechargeable battery.

Comparatively, after the rechargeable battery according to the exemplary embodiment of the present invention was subjected to a bending test of 10,000 cycles, the battery kept a capacity of 98% as compared to its initial capacity. Thus, even after the rechargeable battery according to the exemplary embodiment of the present invention was bent 10,000 cycles, it was confirmed that the performance capacity of the rechargeable battery was kept.

While the present invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims and their respective equivalents.

DESCRIPTION OF SOME OF THE REFERENCE SYMBOLS

11, 12: First and second electrodes
11*a*, 12*a*: Coating part
11*b*, 12*b*: Uncoated region
13: Separator
14, 15: First and second electrode tabs
16, 17: Insulating member
18: Fixed part
110: Electrode assembly
120: Case (pouch)

121: Polymer sheet
122: Nylon sheet
123: Metal sheet
130: Margin
131, 132: First and second bonded parts
201, 202: First and second exterior materials
G: Tab gap
ML: Length of margin part
L: Characteristic length
R: Allowable curvature radius
t: Thickness
θ: Angle

What is claimed is:

1. A rechargeable battery, comprising:
an electrode assembly comprising a first electrode, a separator, and a second electrode stacked together and the first electrode, the separator, and the second electrode being fixed with respect to each other by a fixed part at one side of the electrode assembly; and
a flexible case accommodating the electrode assembly therein, the case having an inner surface opposite a free end of the electrode assembly,
wherein a gap is between the free end of the electrode assembly and the inner surface of the case to accommodate a change in length of the electrode assembly at the free end when the electrode assembly is bent, such that the flexible case and the electrode assembly are configured to be bent together when a bending stress is applied to the rechargeable battery; and
wherein a length of the gap is equal to 0.5*t*L/R, wherein L is a length of the electrode assembly, t is a thickness of the electrode assembly, and R is allowable curvature radius of the electrode assembly.

2. The rechargeable battery of claim 1, further comprising:
a first electrode tab and a second electrode tab connected to the first electrode and the second electrode, respectively, wherein the first and second electrode tabs extend from one end of the case to an outside thereof, and
wherein the gap is at an opposite side of the electrode assembly from the first electrode tab and the second electrode tab.

3. The rechargeable battery of claim 2, wherein the first electrode and the second electrode have uncoated regions corresponding to sides of the first electrode tab and the second electrode tab, respectively.

4. The rechargeable battery of claim 3, wherein the fixed part is bonded to the uncoated region of the first electrode, the separator, and the uncoated region of the second electrode by an adhesive.

5. The rechargeable battery of claim 4, wherein the separator comprises a first bonded part bonded to the uncoated region of the first electrode, a second bonded part bonded to the uncoated region of the second electrode, and a cut groove partitioning the first bonded part and the second bonded part from each other at the fixed part.

6. The rechargeable battery of claim 3, wherein the gap is at an opposite side of the electrode assembly from the fixed part.

7. The rechargeable battery of claim 1, wherein the characteristic length L is a length of the electrode assembly along which the first electrode, the separator, and the second electrode in the electrode assembly are slidable relative to each other.

8. The rechargeable battery of claim 1, wherein when the characteristic length L is 110 mm and the thickness t is 1.3 mm, the allowable curvature radius R is 20 to 50 mm.

9. The rechargeable battery of claim 8, wherein when the characteristic length L is 110 mm and the thickness t is 1.3 mm, the allowable curvature radius R is 25 to 40 mm.

* * * * *